United States Patent
Delaney et al.

(10) Patent No.: US 6,622,302 B1
(45) Date of Patent: Sep. 16, 2003

(54) METHODS AND APPARATUS FOR DYNAMIC VERSION TRANSITION OF MANAGEMENT APPLICATIONS AND ATTACHED SUBSYSTEMS

(75) Inventors: William P. Delaney, Wichita, KS (US); Ray Jantz, Wichita, KS (US); Stan Krehbiel, Wichita, KS (US)

(73) Assignee: LSI Logic Corporation, Milpitas, CA (US)

(*) Notice: Subject to any disclaimer, the term of this patent is extended or adjusted under 35 U.S.C. 154(b) by 532 days.

(21) Appl. No.: 09/607,691

(22) Filed: Jun. 30, 2000

(51) Int. Cl.$^7$ .................. G06F 9/44; G06F 13/10; G06F 9/00

(52) U.S. Cl. .............. 717/170; 717/168; 709/321; 709/325; 709/327

(58) Field of Search .................. 717/168, 170; 710/5, 104, 7, 8; 707/203; 709/202, 203, 223, 321, 325, 327

(56) References Cited

U.S. PATENT DOCUMENTS

| | | | | |
|---|---|---|---|---|
| 5,579,509 A | * | 11/1996 | Furtney et al. | 717/169 |
| 5,692,111 A | * | 11/1997 | Marbry et al. | 358/1.15 |
| 5,732,275 A | * | 3/1998 | Kullick et al. | 717/170 |
| 5,764,992 A | * | 6/1998 | Kullick et al. | 717/170 |
| 6,074,435 A | * | 6/2000 | Rojest.ang.l | 717/173 |
| 6,085,333 A | * | 7/2000 | DeKoning et al. | 714/7 |
| 6,167,567 A | * | 12/2000 | Chiles et al. | 717/173 |
| 6,240,470 B1 | * | 5/2001 | Murayama et al. | 710/48 |
| 6,311,320 B1 | * | 10/2001 | Jibbe | 717/111 |
| 6,360,362 B1 | * | 3/2002 | Fichtner et al. | 717/168 |
| 6,446,199 B1 | * | 9/2002 | Howe et al. | 713/1 |
| 6,480,955 B1 | * | 11/2002 | DeKoning et al. | 713/100 |

OTHER PUBLICATIONS

"Driver—PC Webopaedia Definition and Links," [online] May 15, 1998 [accessed 1/24/1003], Retrieved from Internet <URL: http://web.archive.org/web/19991013071644/http://webopaedia.internet.com/TERM/d/driver.html>, pp. 1–2.*

"IEEE 100: The Authoritative Dictionary of IEEE Standards Terms," 2000, IEEE, 7$^{th}$ ed., pp. i, ii, 438.*

"Sun StorEdge(TM) A3500FC Controller Upgrade Guide," Sep. 1999, Sun Microsystems, Inc., pp. i–viii, 1–22.*

"Sun StorEdge(TM) RAID Manager 6.22 User's Guide," Sep. 1999, Sun Microsystems, Inc., pp. i–xiv, 143–152.*

* cited by examiner

Primary Examiner—Gregory Morse
Assistant Examiner—Eric B. Kiss
(74) Attorney, Agent, or Firm—Lathrop & Gage, L.C.

(57) ABSTRACT

Methods and associated structure for on the fly (dynamic) transition between versions among a management application process and an associated I/O subsystem. A management application program operable on a management system coupled to the I/O subsystem instantiates a script engine to execute script language commands for communicating with the I/O subsystem on behalf of the management application. The particular script engine instantiated is one that is compatible with the present revision of firmware operable in the I/O subsystem. When a script command execution causes a firmware upgrade in the I/O subsystem, the present script engine saves its state of operation, notifies the management application of the upgrade and resultant incompatibility and terminates. The management application then instantiates a new script engine compatible with the newly upgraded firmware version in the I/O subsystem. The newly instantiated script engine then restores the state information saved by its predecessor script engine and continues operation on behalf of the management application with no perceptible interruption in the processing of the script commands.

15 Claims, 5 Drawing Sheets

METHODS AND APPARATUS FOR DYNAMIC VERSION TRANSITION OF MANAGEMENT APPLICATIONS AND ATTACHED SUBSYSTEMS

BACKGROUND OF THE INVENTION

1. Field of the Invention

The invention relates to intelligent I/O device management and in particular relates to improvements to techniques and structure for managing the upgrade of an I/O subsystem controller firmware.

2. Discussion of Related Art

I/O subsystems connected to host computing systems have rapidly evolved to include significant local intelligence within the I/O subsystem. Such intelligent I/O subsystems include significant local processing power and associated memory for storing program instructions to operate the I/O subsystem. These memories within an I/O subsystem contain, among other things, firmware, a collection of program instructions and variables used to operate the I/O subsystem.

In particular, for example, storage subsystems possess significant processing and associated program memory capabilities for performing high-level storage management techniques within the storage subsystem. A RAID storage subsystem includes various levels of RAID storage management techniques within the storage controllers of the storage subsystem. The firmware for operating such RAID storage management features in the storage controllers can be quite extensive.

It is a common problem with such intelligent I/O subsystems to upgrade the firmware within the subsystems as new, improved I/O firmware becomes available. It is generally known to provide a management console application operable on an attached host system to provide an administrative user a convenient user interface for performing management functions within the I/O subsystem such as the firmware upgrade of the I/O subsystem. For example, storage subsystems often include a management application program operable on an attached host system to permit an administrative user to manage the storage subsystem. For example the management application program may include convenient user interface features to permit an administrative user to configure a plurality of storage devices within the storage subsystem. Such a management application program may also include features to permit the downloading of updated firmware to the storage subsystem.

A problem remains in such a firmware upgrade process initiated by a management application program operable on an attached host computer. In particular, it may be problematic for the management application program to continue communications with the I/O subsystem following an upgrade of the firmware within the I/O subsystem. The upgraded I/O subsystem firmware may be incompatible with the management application program such that the administrative user may be forced to exit the management application program and restart a newer version of that program.

It is evident from the above that need exists for improved communications between a management application program and an intelligent I/O subsystem for purposes of upgrading firmware within the I/O subsystem.

SUMMARY OF THE INVENTION

The present invention solves the above and other problems, thereby advancing the state of the useful arts, by providing methods and associated structure for on-the-fly version compatibility transition between a management application program and its associated intelligent I/O subsystem. More specifically, the present invention defines a management application program that utilizes a script language interpreted by a script engine for communicating with an associated intelligent I/O subsystem. The script language includes a rich variety of commands for interaction with the attached intelligent I/O subsystem. Among the commands is a firmware upgrade command that performs associated processing to upgrade the firmware revision operable within the attached intelligent I/O subsystem. In addition to upgrading the I/O subsystem, the script engine in response to performing such an upgrade command informs the management application program that a firmware version upgrade has just taken place. In response to such a notification, the management application program instantiates an upgraded version of the script engine to maintain compatibility with the newly upgraded firmware now operable within the intelligent I/O subsystem.

Still more specifically, a script engine is instantiated by the management application process to be compatible with the presently operating version of firmware in the intelligent I/O subsystem. The management application process determines the present version operable within the I/O subsystem by querying the intelligent I/O subsystem as to its present revision level. A corresponding revision of the script engine is instantiated by the management application program when it initializes.

The presently instantiated script engine reads script commands supplied to it by the management application program and communicates with the intelligent I/O subsystem as required to perform the script commands. When a firmware upgrade command is executed, the script engine communicates with the I/O subsystem to provide it with the specified upgraded version of the firmware. In addition, the presently instantiated script engine notifies the management application program that a new version of firmware has been successfully downloaded to the intelligent I/O subsystem. Upon receipt of such notification, the management application program terminates the presently instantiated script engine and instantiates a new script engine having a version compatible with the present version of firmware recently downloaded to the intelligent I/O subsystem. The new script engine is provided with state information saved by the original (predecessor) script engine allowing it to continue processing the original sequence of script commands in a seamless manner.

BRIEF DESCRIPTION OF THE DRAWINGS

The following detailed description of the preferred embodiments can best be understood when read in conjunction with the following drawings, in which.

DETAILED DESCRIPTION OF THE PREFERRED EMBODIMENTS

While the present invention is susceptible to various modifications and alternative forms, specific embodiments thereof have been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 1:
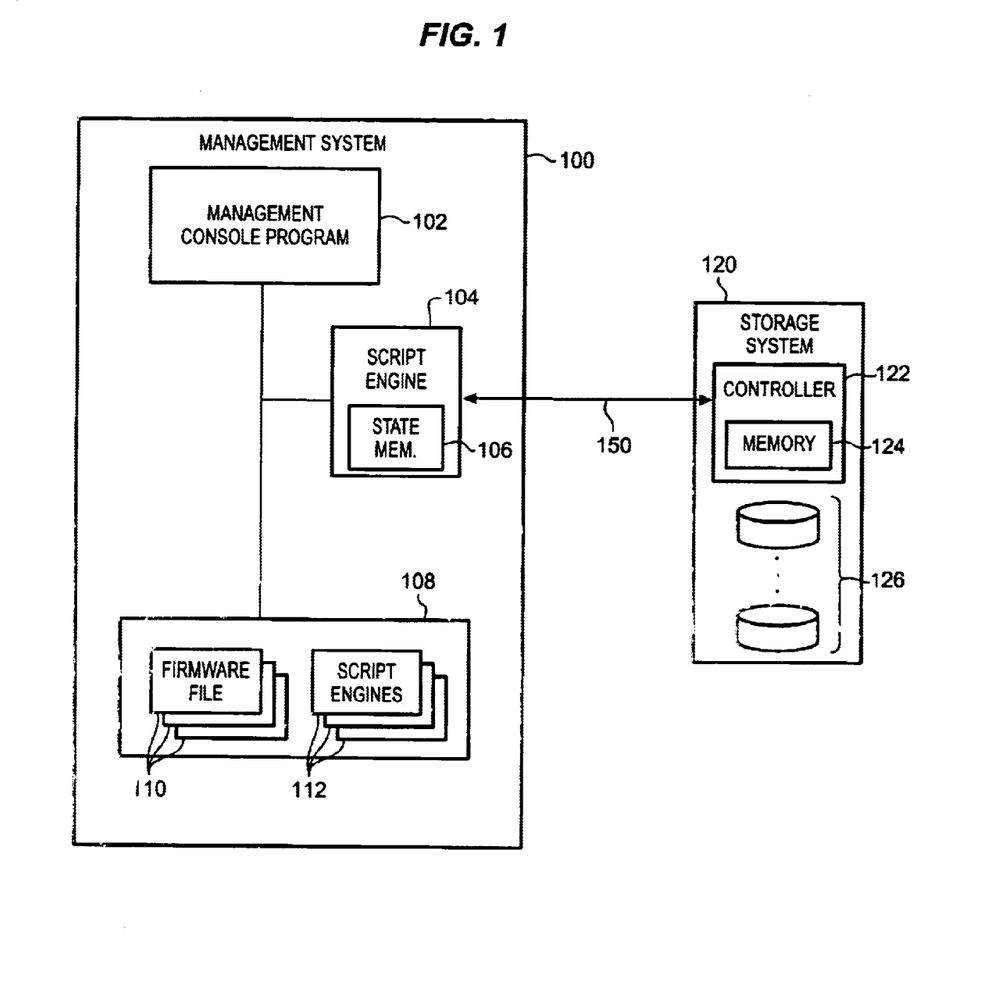
FIG. 1 is a high-level block diagram of a management system including script engine features in accordance with the present invention.

FIG. 1 is a block diagram including features of the present invention. Storage system 120 is exemplary of an I/O subsystem that performs I/O functions on behalf of attached host systems (not shown). Storage system 120 includes controller 122 for controlling overall operation of the storage system 120. Storage system 120 also includes the disk drives 126 for storage and retrieval of information provided by attached host systems (not shown). Storage system 120 is therefore representative of a computer mass storage I/O subsystem. It should be noted that the present invention is applicable to a wide variety of I/O subsystems as well as intelligent devices in general. A storage subsystem such as storage system 120 shown in FIG. 1 is merely exemplary of one such I/O subsystem. As used herein, the terms storage system, storage subsystem, I/O system and I/O subsystem will be used interchangeably.

Controller 122 in storage system 120 includes memory 124 for storing, among other things, programmed instructions used for operation of the controller 122 within storage system 120. The programmed instructions are executed by the controller 122 to control operation of the I/O system 120 including interfacing with attached host systems (not shown) and interfacing with management system 100. Programmed instructions ("firmware") stored in memory 124 have a revision attribute associated therewith. Typically, upgrades to such firmware will reflect a different revision attribute than is associated with earlier or other versions of such firmware.

It is common for I/O subsystems having firmware embedded within a controller to permit an external management system 100 to upgrade the firmware as necessary. Management system 100 communicates with storage system 120 via path 150 for purposes of upgrading such firmware in the memory 124 of controller 122 and for other management purposes. Management system 100 is a system that provides a user interface for an administrative user to manage various functions within the attached I/O subsystem (i.e., storage system 120). A management console program 102 operable within management system 100 provides this user interface for an administrative user. In the preferred embodiment of the present invention, management console program 102 (also referred to herein as management application program) interacts with storage system 120 through a script engine 104.

Script engine 104 is an element that interprets commands provided in a script language. Script engine 104 may include state memory 106 for saving state information as discussed further herein below. Management application program 102 instantiates a particular version of script engine 104 known to be compatible with the present version of firmware operable within storage system 120. Storage 108 within management system 100 retains a number of script engines 112 each having a revision code associated therewith for use by the management console program 102 in communicating with various revision levels of firmware in attached I/O systems 120. In addition, storage 108 within management system 100 retains a number of firmware revision files 110 for downloading to storage system 120. Each firmware file 110 has a revision code associated therewith.

As described further herein below, management system 100 includes features to update firmware within storage system 120 in response to an administrative user's request via management application program 102. In accordance with the present invention the update process (and all communications with storage system 120) are controlled through script engine 104. Communications between management application program 102 and storage system 120 is therefore preferably defined in terms of script language commands processed by script engine 104.

One such script command provided by an administrative user through management console program 102 requests that the firmware within storage system 120 be upgraded. The script command includes a reference to a particular firmware file 110 stored within storage 108 of management system 100. In response to processing of such a command, script engine 104 causes storage system 120, via controller 122, to upgrade its firmware stored in memory 124. Upon completion of such an upgrade, script engine 104 notifies management application program 102 that a new version of firmware is now operable within storage system 120. Management application program 102 then terminates operation of the current script engine 104 and instantiates a new script engine selected from script engine 112 to carry on further communications with storage system 120. In this manner, management system 100 assures continuing communication with storage system 120 through compatible versions of a script engine 104 and associated firmware operable within storage system 120.

Figure 2:
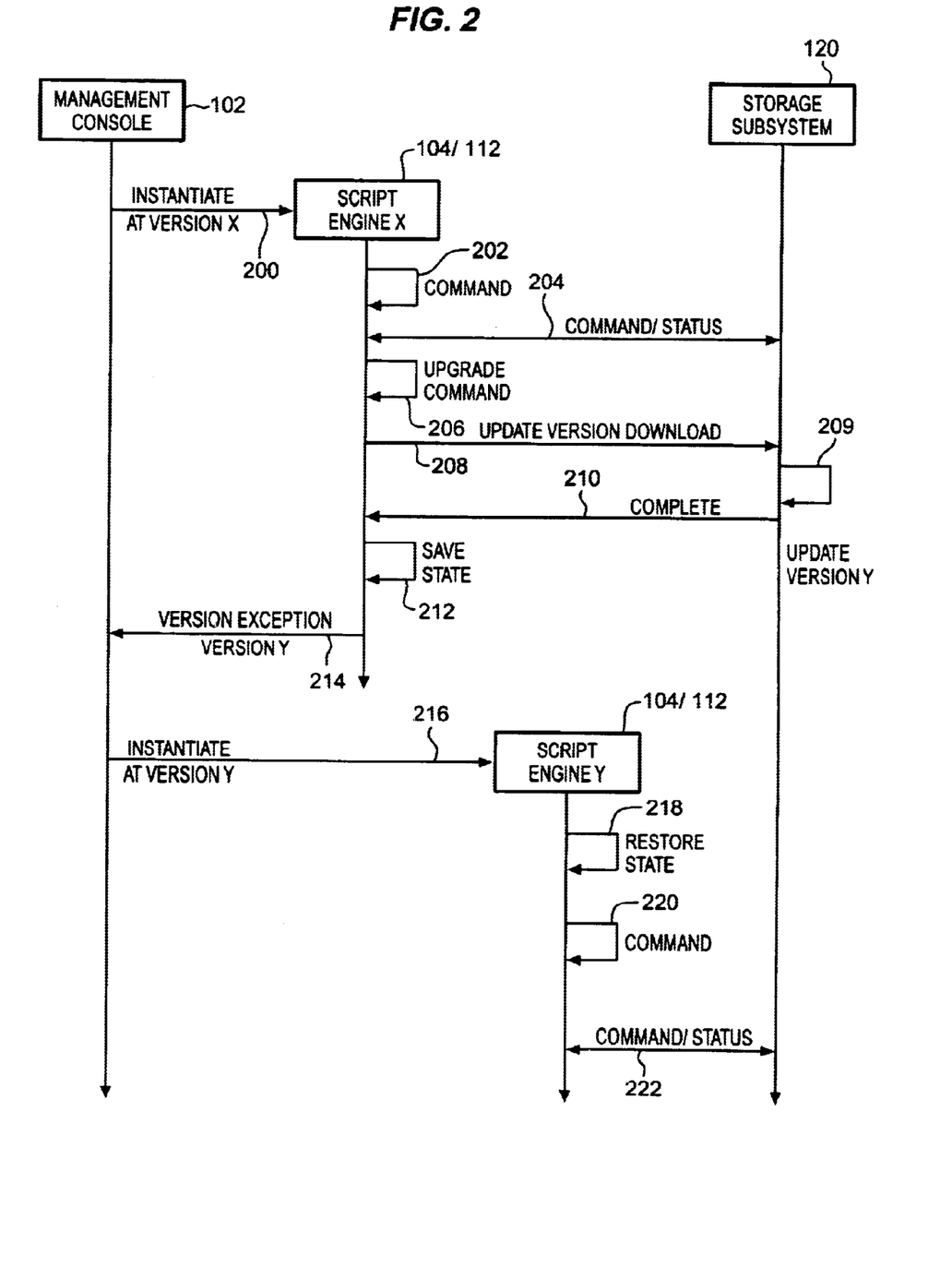
FIG. 2 is a diagram depicting functional relationships of communications among the elements of FIG. 1 over time.

FIG. 2 is a schematic diagram depicting typical functional relationships plotted over time between the various elements shown in FIG. 1. In particular, FIG. 2 shows functional relationships between management console 102 a first script engine "X" 104, a second script engine "Y" 104, and storage subsystem 120. The downward directed arrows descending from each element indicate a timescale for operation of each element. Horizontally directed arrows indicate specific exchanges between an element at the origin of a horizontally directed arrow and a second element at the end point of such a horizontally directed arrow.

In particular, arrow 200 represents processing by management application program 102 to instantiate a first script engine 104 having a revision attribute "X". Management application program 102 initially inquires of storage system 120 to determine the present revision of firmware operating within storage subsystem 120. In the alternative, management console program 102 may simply store in an associated memory the current revision level known to be last operating in storage system 120. With knowledge of the current revision of firmware operable in storage subsystem 120, management application program 102 selects an appropriate script engine to instantiate by the processing of arrow 200.

An administrative user then provides script commands for interpretation and execution by the newly instantiated script engine. Script engine 104 then begins processing the supplied script commands. Arrow 202 represents processing of a typical script command within the presently instantiated script engine. The command is parsed and interpreted by the script engine to determine appropriate communications required with storage system 120. Arrow 204 represents communications between the presently instantiated script engine 104 and storage subsystem 120 to perform the command parsed and interpreted as described above with respect to arrow 202. Appropriate commands are transmitted to storage subsystem 120 and resulting status is returned from the storage system to the presently instantiated script engine as indicated by arrow 204.

Arrow 206 represents recognition and interpretation of an upgrade command provided by the administrative user requesting the update of firmware operating within the storage subsystem 120. Arrow 208 represents processing by the script engine to transfer the supplied update firmware file to storage subsystem 120. Arrow 209 then represents processing within storage subsystem 122 to download the supplied upgraded firmware and to update its program memory in accordance with that downloaded file. As shown in FIG. 2 the upgraded firmware has a revision attribute "Y" associated therewith. Arrow 210 represents a completion status returned from storage subsystem 122 to the presently instantiated script engine indicating successful upgrade of the firmware.

In response to the successful status returned at arrow 210, arrow 212 represents processing within the script engine to save current state information regarding processing by the script engine. Arrow 214 then represents the return of a version exception status from the presently instantiated script engine to the management console program 102. The version exception message indicates a new version "Y" now operable within storage subsystem 120. The version exception message preferably also includes the saved state information so that the management console program 102 can supply the saved state information to the next instantiated script engine. In the alternative, the state information may be saved in a memory associated with the script engine's operation (i.e. state memory 106 within the script engine 104 of FIG. 1). A next instantiated script engine then restores the saved state information from the memory. The presently instantiated script engine corresponding to revision "X" then terminates further operation. Arrow 216 represents instantiation by management console program 102 of a new script engine compatible with revision "Y."

Arrow 218 represents processing within the newly instantiated script engine "Y" to restore the previously saved state information saved by the previously instantiated script engine "X." As noted above, the saved state information is preferably transferred to the new script engine by the management console program 102 as a parameter of instantiation thereof. In the alternative, the saved state information may be restored from a memory associated with the script engine operation (i.e. state memory 106 within the script engine 104 of FIG. 1). The restored state information enables the newly instantiated script engine to continue communications with the storage subsystem 120. Arrows 220 and 222 represent the continuation of processing of script commands by the newly instantiated script engine and associated communications with storage subsystem 120 resulting from the interpretation of script commands.

Figure 3:
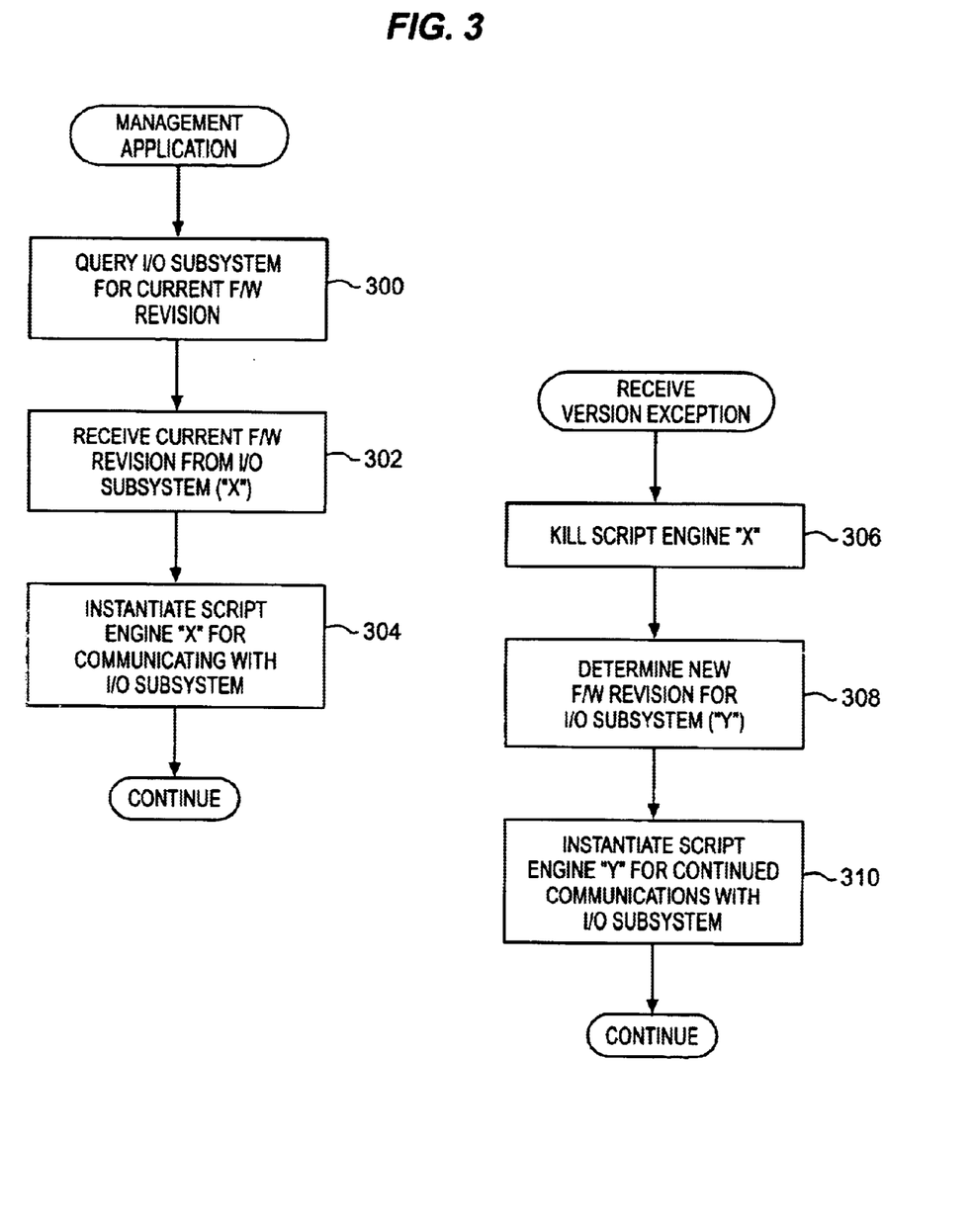
FIG. 3 is a flowchart of methods operable within the management application program of the present invention.

FIG. 3 provides flowcharts describing operations within the management application program to instantiate appropriate script engine versions to maintain communications with an I/O subsystem in which firmware upgrades are being performed. In particular, element 300 represents initial querying of the I/O subsystem to determine the current revision of firmware operable therein. As noted above, the management application program may communicate directly with the I/O subsystem to inquire as to its current revision level or may store in an associated memory the last known firmware revision operable within the I/O subsystem. Element 302 is operable to receive the present firmware revision from the I/O subsystem or to retrieve the presently known revision from a memory associated with the management application. Element 304 then instantiates an appropriate script engine "X" to communicate with the I/O subsystem presently operating with firmware revision "X."

As noted above, the management application proceeds with normal processing until a version exception message is received from the presently instantiated script engine. Receipt of a version exception message from the presently instantiated script engine indicates that firmware within the I/O subsystem has been upgraded to a new revision. The version exception message preferably indicates the version attribute associated with the upgraded firmware now operable within the I/O subsystem. In response to receipt of such a version exception message, element 306 is first operable to terminate further operation of the presently instantiated script engine having a version attribute "X". Element 308 is operable to determine the revision attribute of the newly operating firmware in the I/O subsystem. As noted, the new version attribute "Y" is preferably communicated to the management application program as part of the version exception message received from the presently instantiated script. Engine element 310 is then operable to instantiate new script engine "Y" for continued communications with the I/O subsystem now operating firmware revision "Y."

Figure 4:
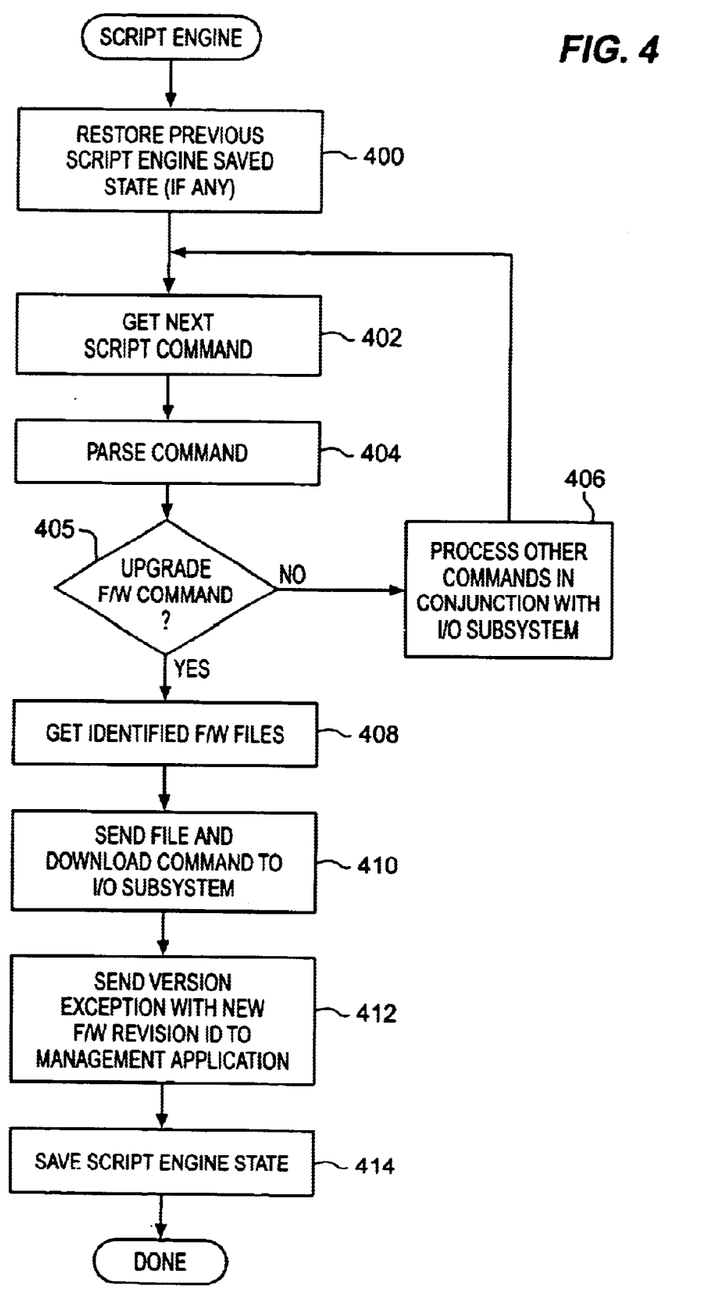
FIG. 4 is a flowchart of methods operable within a script engine component of the present invention.

FIG. 4 is a flowchart describing operation of an instantiated script engine. In particular, element 400 represents initial processing of a script engine to restore state information saved by the previously instantiated script engine (if any). Processing of the method of FIG. 4 represents processing of any script engine, an originally instantiated script engine or a newly instantiated script engine. In the case of an originally instantiated script engine, element 400 would determine that no previously saved state information exists and would instead initialize state information to begin communications with an I/O subsystem. As noted above, the state information is preferably returned to the management console program by an earlier script engine and sent to the newly instantiated script engine as a parameter of the instantiation thereof. In the alternative, the state information may be saved and then restored from a memory associated with the script engine operation.

Element 402 is next operable to get the next script command supplied by the administrative user operating the management application program that instantiated the script engine. Element 404 parses the script command to recognize the type of command to be interpreted and executed. Element 405 then determines if the parsed script command has been recognized as an upgraded firmware script command. If not, element 406 is operable to process other commands and communicate appropriately in conjunction with the I/O subsystem. Those skilled in the art will recognize a wide variety of commands that may be processed on behalf of the management application program to effectuate communication of management requests with the I/O subsystem. Following completion of the processing of such other commands by element 406, processing continues by looping back to element 402 to continue processing additional script commands.

If element 405 recognizes an upgrade firmware command, processing continues with element 408 to retrieve the identified firmware file from the storage elements associated with the management application program. Element 410 is then operable to transmit the identified firmware file along with appropriate download commands to the I/O subsystem. As noted further herein below, the I/O subsystem receives the firmware file and download commands and upgrades firmware within its program memory. The I/O subsystem then indicates a completion status back to the script engine.

Element 412 saves any state information required to permit a newly instantiated script engine to continue communications with the I/O subsystem. Element 414 then sends a version exception message back to the management application program. The version exception message preferably includes a new firmware revision attribute indicative of the new firmware revision level now operable within the I/O subsystem. Preferably, the version exception message also includes the saved state information. The saved state information thus returned to the management application program is then forwarded to the successor script engine when instantiated to permit the new script engine to continue processing of script commands with the I/O subsystem. As noted herein, in the alternative, the state information may also be saved in a memory associated with operation of the script engines such that the script engine restores the state information from that memory upon initialization. The presently instantiated script engine then terminates further processing.

As discussed above, the management application program will then instantiate a new script engine compatible with the newly upgraded firmware now operable within the I/O subsystem. Further, as discussed above, the newly instantiated script engine initially (at element 400 discussed above) restores the saved state information supplied by the management program or restored from a memory associated with operation of the script engine and continues further communications with the I/O subsystem on behalf of the management application program.

Figure 5:
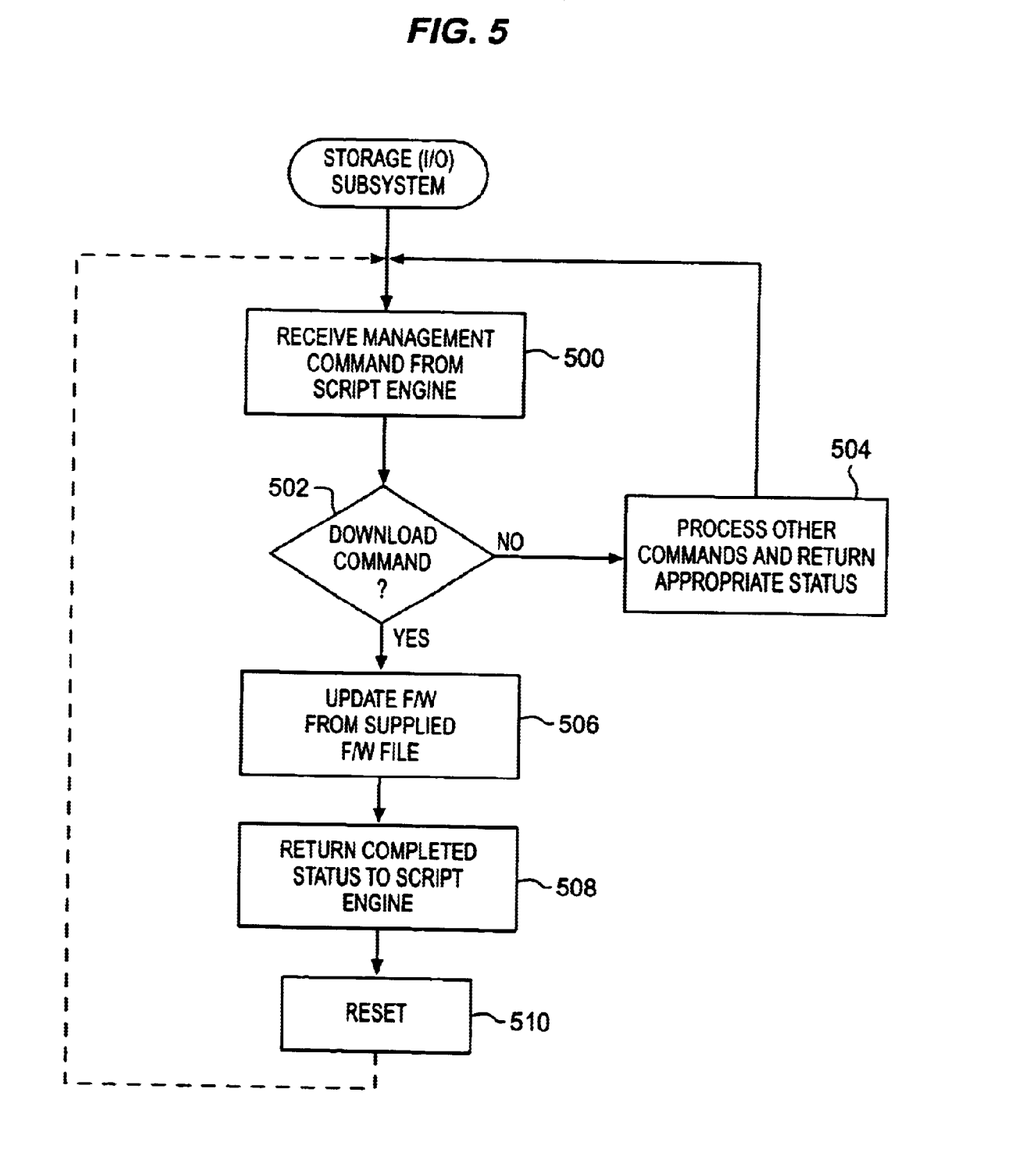
FIG. 5 is a flow chart of processing within an I/O subsystem operable in conjunction with the management application and script engine of the present invention.

FIG. 5 is a flowchart describing operations within the storage subsystem to download and upgrade its firmware and process other commands received from the script engine described above. In particular, element 500 receives a command communicated from the script engine on behalf of the management application program. Element 502 is then operable to determine whether the received command is a download firmware command. If not, element 504 is operable to process other commands received from the script engine and to return an appropriate status message to the script engine indicating completion of the received command. Processing then continues by looping back to element 500 to process other received commands. Those skilled in the art will recognize a variety of other management commands and may be received from the script engine and processed within the I/O subsystem for purposes of managing the I/O subsystem on behalf of a management application program.

If element 502 determines that the received command is indeed a download firmware command, element 506 is next operable to update the firmware within the I/O subsystem in accordance with the supplied firmware file transmitted from the script engine. Element 508 is then operable to return a completion status to the script engine indicating successful upgrade of the firmware operable within the storage subsystem. Element 510 is then operable to reset the I/O subsystem to commence operation of the newly upgraded firmware. Following completion of the reset, the I/O subsystem initializes its operation and again processes element 500 to receive commands from a newly instantiated script engine as described above.

Those skilled in the art will recognize a wide variety of design choices well known to those skilled in the art for structuring the methods described above with respect to FIGS. 3 through 5. The flowcharts of FIGS. 3 through 5 are therefore intended merely as exemplary of one possible embodiment of the methods of the present invention. Key to the present invention is the operation of the management application program to instantiate a script engine process to communicate on behalf of the application program with an attached I/O subsystem. A further key to the present invention is termination of a first script engine and instantiation of a new script engine in response to upgrading of the firmware operable within the I/O subsystem. Yet another key to the present invention is the saving and restoration of state information by the script engine to permit seamless continued communication with the I/O subsystem even through a major change in the subsystem such as a firmware upgrade process. Use of a script engine in this manner reduces complexities normally imposed upon the application program to ensure compatibility with upgraded firmware within the I/O subsystem to enable continued communication with the I/O subsystem.

While the invention has been illustrated and described in detail in the drawings and foregoing description, such illustration, and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for updating firmware in an I/O subsystem coupled to a management application comprising the steps of:

instantiating from said management application a first script engine cooperable with said management application wherein said first script engine has a first script version associated therewith and wherein firmware presently operable in said I/O subsystem has a first firmware version associated therewith compatible with said first script version and wherein said first script engine is operable to effectuate communication with said I/O subsystem in accordance with script commands;

upgrading firmware in said I/O subsystem by providing script commands from said management application to said script engine wherein the upgraded firmware has a second firmware version associated therewith and wherein said second firmware version is incompatible with said first script version;

notifying said management application from said first script engine that said I/O subsystem is presently operating with an incompatible version of firmware; and instantiating from said management application a second script engine cooperable with said management application wherein said second script engine has a second script version associated therewith and wherein said second firmware version is compatible with said second script version and wherein said second script engine is operable to effectuate communication with said I/O subsystem in accordance with script commands.

2. The method of claim 1 further comprising the step of:

continuing communication with said I/O subsystem following the instantiation of said second script engine.

3. The method of claim 2 further comprising:

saving the present state of said first script engine in response to the upgrading of said firmware in said I/O subsystem.

4. The method of claim 3 further comprising:

restoring, within said second script engine, the saved state of said first script engine in response to instantiation of said second script engine.

5. The method of claim 4 further comprising the step of:

terminating operation of said first script engine prior to instantiation of said second script engine.

6. The method of claim 4 wherein the step of saving comprises the step of returning said present state information to said management application, and wherein the step of restoring includes the step of receiving said present state information from said management application as a parameter of the instantiation of said second script engine.

7. The method of claim 4 wherein the step of saving comprises the step of storing said present state information in a memory associated with said first script engine, and wherein the step of restoring includes the step of retrieving said present state information from said memory.

8. A system for management of an I/O subsystem comprising:

a management console program for interacting with an administrative user for purposes of managing the I/O subsystem;

a first script engine instantiated by said management console program and coupled to said management console program for processing script commands on behalf of said management console program to effectuate communication with said I/O subsystem on behalf of said management console program, and a revision exception generator within said first script engine for notifying said management console program of an update in firmware operable in said I/O subsystem, wherein said first script engine has a revision attribute compatible with a corresponding revision attribute associated with said I/O subsystem, wherein said management console program is operable, in response to notification from said revision exception generator, to terminate said first script engine and to instantiate a second script engine selected from said plurality of script engines according to a revision attribute of each script engine of said plurality of script engines.

9. The system of claim 8 further comprising:

a memory device coupled to said management console program; and a plurality of script engines stored on said memory device, wherein said management console program is operable to select said first script engine from said plurality of script engines according to a revision attribute of each script engine of said plurality of script engines.

10. The system of claim 9 further comprising:

a state memory coupled to said first script engine and to said second script engine for saving state information wherein said first script engine is operable to save state information prior to termination of said first script engine and wherein said second script engine is operable to restore the saved state information to continue communications with said I/O subsystem.

11. The system of claim 8 wherein said revision exception generator is further operable to return saved state information regarding operation of said first script engine and wherein said management console program is operable to transmit said saved state information to said second script engine as a parameter of instantiation thereof.

12. A system for communicating with an intelligent I/O device comprising:

a management application for exchanging information with said intelligent I/O device in accordance with script commands;

a communication medium coupling said management application to said intelligent I/O device;

a plurality of script engine means associated with said management application for processing said script commands to effectuate communication with said intelligent I/O device;

means associated with said management application for determining a revision attribute associated with firmware operable in said intelligent I/O device;

selection means associated with said management application for selecting a first script engines means of said plurality of script engine means wherein said first script engine means is compatible with said revision attribute of said firmware; and instantiation means in said management application for instantiating said first script engine means in response to selection of said first script engine means by said selection means;

a revision exception generator within said first script engine means for notifying said management console program of an updated revision attribute of firmware operable in said intelligent I/O device; and revision exception sensing means coupled with said instantiation means and with said selection means for selecting a second script engine means of said plurality of script engine means wherein said second script engine means is compatible with said updated revision attribute and for instantiating said second script engine means.

13. The system of claim 12 wherein said revision exception sensing means is operable to terminate operation of said first script engine means prior to instantiating said second script engine means.

14. The system of claim 12 further comprising:

state saving means associated with said management application for receiving saved state information from said first script engine means and for providing said saved state information to said second script engine means.

15. The system of claim 12 further comprising:

a memory means associated with said first script engine means and with said second script engine means such that said first script engine means saves said state information in said memory means and said second script engine means restores said saved state information from said memory means.

* * * * *